United States Patent
Pierobon (10) Patent No.: US 12,199,554 B2
(45) Date of Patent: **\*Jan. 14, 2025**

(54) PHOTOVOLTAIC PLANT, IN PARTICULAR A GROUND PHOTOVOLTAIC PLANT

(71) Applicant: Francesco Pierobon, San Martino di Lupari (IT)

(72) Inventor: Francesco Pierobon, San Martino di Lupari (IT)

(*) Notice: Subject to any disclaimer, the term of this patent is extended or adjusted under 35 U.S.C. 154(b) by 0 days.

This patent is subject to a terminal disclaimer.

(21) Appl. No.: 18/125,538

(22) Filed: Mar. 23, 2023

(65) Prior Publication Data

US 2023/0231511 A1    Jul. 20, 2023

Related U.S. Application Data

(63) Continuation of application No. 17/083,571, filed on Oct. 29, 2020, now Pat. No. 11,637,525.

(30) Foreign Application Priority Data

Oct. 31, 2019   (IT) .......................... 102019000020216

(51) Int. Cl.
  *H02S 20/32*   (2014.01)
(52) U.S. Cl.
  CPC .................... *H02S 20/32* (2014.12)
(58) Field of Classification Search
  CPC .................. H02S 20/30; H02S 20/32
  See application file for complete search history.

(56) References Cited

U.S. PATENT DOCUMENTS

| | | | |
|---|---|---|---|
| 2011/0072740 A1* | 3/2011 | Dieter | H02S 20/10 52/173.3 |
| 2015/0214885 A1* | 7/2015 | Wu | H02S 20/32 136/246 |
| 2015/0244309 A1 | 8/2015 | Sakai et al. | |
| 2019/0296688 A1* | 9/2019 | Kresse | H02S 20/10 |
| 2020/0036325 A1* | 1/2020 | Poivet | H02S 30/20 |
| 2020/0304057 A1* | 9/2020 | Suan | F24S 25/12 |

FOREIGN PATENT DOCUMENTS

| | | | | |
|---|---|---|---|---|
| DE | 202014100397 U1 * | 3/2015 | | F24J 2/526 |
| ES | 1061938 U | 4/2006 | | |
| JP | 2010205764 A | 9/2010 | | |
| WO | 2013170718 A1 | 11/2013 | | |
| WO | WO-2018167643 A1 * | 9/2018 | | F24S 25/70 |

OTHER PUBLICATIONS

English machine translation of Cortec (DE-202014100397-U1) provided by the EPO website, All Pages, 2022. (Year: 2022).*

Search Report for IT 102019000020216 dated May 13, 2020 (9 pages).

* cited by examiner

*Primary Examiner* — Daniel P Malley, Jr.
(74) *Attorney, Agent, or Firm* — Tutunjian & Bitetto, P.C.

(57) ABSTRACT

The present invention relates to a photovoltaic plant including a plurality of units each having at least one respective photovoltaic panel, a support structure of the plurality of units designed to support the latter at a distance from the ground (GR).

10 Claims, 11 Drawing Sheets

PHOTOVOLTAIC PLANT, IN PARTICULAR A GROUND PHOTOVOLTAIC PLANT

TECHNICAL FIELD OF THE INVENTION

The present invention relates to a photovoltaic plant, in particular ground-based comprising a plurality of units each having at least one respective photovoltaic panel.

STATE OF THE PRIOR ART

The solar trackers are devices that, through appropriate mechanical movements, allow to "track" the apparent movement of the sun in the sky or at least to orient one or more photovoltaic panels in a favourable manner with respect to the sun rays. Clearly, the main purpose of a tracker is to maximize the efficiency of the device hosted on board.

In the photovoltaic field, the panels mounted on a tracker are generally arranged geometrically on a single panel, so that a tracker is not required for each single panel.

Based on their construction characteristics, the solar trackers are divided according to:
degrees of freedom offered;
power supplied to the orientation mechanism;
type of electronic control.

The solar trackers can offer the panel uniaxial or biaxial freedom of movement.

Single-axis photovoltaic trackers are devices that "track" the sun by rotating around a single axis. Depending on the orientation of this axis, four types of trackers can be distinguished: tilt trackers, roll trackers, azimuth trackers and polar axis trackers.

Tilt or "pitch" trackers, which are the simplest solar trackers to make and also the cheapest, rotate around an axis in an east-west direction.

The roll trackers aim to follow the sun along the celestial vault in its daily path, regardless of the season of use. In this case the rotation axis is north-south, while the height of the sun with respect to the horizon is not a parameter that is considered.

The azimuth trackers rotate around a vertical axis perpendicular to the ground. The panels are mounted on a rotating base coplanar to the ground which, by means of a servomechanism, follows the movement of the sun from east to west during the day but, unlike the tilt and roll trackers, without ever changing the inclination of the panel with respect to the ground.

The polar axis trackers rotate, with the aid of a servomechanism, around an axis parallel to the north-south axis of the earth's rotation (polar axis), and thus inclined with respect to the ground.

Biaxial photovoltaic trackers have two axes of rotation, usually perpendicular to each other. Two very common types of biaxial trackers are known, which differ in the different orientation of the rotation axes: the azimuth-elevation ones and the tilt-roll ones.

The azimuth-elevation trackers, which track the sun assisted by a computer calculating the predicted position in the sky or by a light sensor that controls the motors, have their main axis of rotation vertical with respect to the ground and the secondary axis perpendicular to it.

The tilt-roll trackers have the main axis parallel to the ground, while the secondary one is normally perpendicular to the primary axis.

The choice of the tracking system depends on many factors, including the size and characteristics of both the structure and the place of installation, the latitude and the local weather and climatic conditions. Typically, biaxial trackers are used in small residential installations and in countries that enjoy very high incentives. On the other hand, in other cases and for large photovoltaic parks, single-axis roll trackers are indicated, to take advantage of the low costs, as well as the simplicity and robustness of the installation, which allows large scale savings in the face of a significant improvement in production of energy, especially in the afternoon. Uniaxial azimuth trackers, on the other hand, are suitable for high latitudes, where the sun does not reach great heights in the sky.

While requiring simple maintenance consisting of an annual inspection and lubrication (as well as a painting of their structure, typically made of steel), the solar trackers inevitably encounter mechanical problems deriving from the wear of servomechanisms and moving parts that occur over time, especially in highly corrosive environments such as those close to the sea or in polluted industrial locations, with consequent production drops or implant interruptions. In fact, the mechanical parts of the trackers are not very stressed, but subjected to severe atmospheric conditions for at least 20 years. For this reason, tracking systems based on hydraulic mechanisms are generally preferable to those using electric motors, which are more easily oxidizable and subject to the need for their replacement. Therefore, the most profitable use of solar trackers is that in large ground systems, that is, in systems of many tens of KW or higher than MW.

Ordinary maintenance is generally simple, and in the photovoltaic field benefits from a lower sensitivity of the photovoltaic effect to the dust deposited on the surface of the modules, thanks to the best average angle of incidence of sunlight. The whole system must also be designed to withstand the stresses due to wind load, which can be easily calculated.

Tracking systems have a price per kW of installed power that is necessarily higher than those with fixed mounting, since they have moving components, therefore subject to wear and requiring control units driven by computers or sensors. In addition, they require a larger surface area to prevent the modules of a system from shading each other.

Finally, static problems must always be taken into account, since, clearly, rotating components require more complex housings, compared to pieces of equal stability mounted on a fixed support.

The favourable geographical position, a high percentage of direct radiation and the availability of large surfaces have so far been the main success factors for tracker manufacturers, but the incentive rates are very important.

Similar apparatuses can only be mounted with cranes and require foundations with volumes of approximately twenty cubic meters. The forces that these systems have to withstand, which is especially true for bearings and motors, are considerable even in the absence of wind. Most trackers have usually wind sensors and automatically move to a safety position when wind loads threaten the integrity of their mechanics. However, in some systems, this arrangement is not provided (or in any case only in a limited way).

If the modules are mounted at a fixed angle and rotate only on the horizontal plane, it is logically not possible to bring them to a horizontal position: in this case, the sole possible solution is to position the tracker in such a way that it offers the wind its shortest side.

In any case, the wind problem is of fundamental importance. It is not just the risk of a total loss, but first of all the insurance premiums related to the insurance of the systems, and secondly of usury. Components that are constantly running near their load limit also require more frequent repairs or replacements, which increases costs per KWh.

The result is a clear trend towards the use of uniaxial systems; which yield a lower energy production than biaxial ones, but they are also significantly cheaper to produce, as well as being less prone to failures.

US2015214885 concerns a photovoltaic plant with a series of photovoltaic units operated by the same motor, so that by activating this motor it is possible to substantially control the inclination of the units at the same time.

The motion is transmitted to the photovoltaic units by the engine by means of a plurality of motion transmission rods, which rods are offset to each other and connected by means of cardan joints.

SUMMARY OF THE INVENTION

An object of the present invention is to provide a new photovoltaic plant, in particular a ground photovoltaic plant.

Another object of the present invention is to provide a plant as aforementioned that guarantees optimal exploitation of solar energy and therefore high efficiency.

Another object of the present invention is to provide a plant as indicated above which requires less energy for the respective actuation than the solutions proposed so far.

Another object of the present invention is to provide a ground photovoltaic plant equipped with respective very precise and reliable systems for positioning panels.

Another object of the present invention is to provide a ground photovoltaic plant that is not bulky and which has a low visual impact.

Another object of the present invention is to provide a ground photovoltaic plant with support units for the photovoltaic modules that are simple and economical to make and at the same time more resistant and lighter than traditional ones.

Another object of the present invention is to provide a ground photovoltaic plant which is less affected by problems related to wind thrust.

Another object of the present invention is to provide a ground photovoltaic plant that compromises or modifies the conformation and quality of the installation ground less than the plants proposed up to now.

Another purpose of the present invention is to provide a ground photovoltaic plant that allows for quick and easy assembly, inspection or maintenance.

According to one aspect of the invention, a plant according to the present application is provided.

According to another aspect of the invention, a group according to the present application is provided.

The present application refers to preferred and advantageous embodiments of the invention.

BRIEF DESCRIPTION OF THE DRAWINGS

Other features and advantages of the invention will be more evident from the description of an embodiment of a plant, illustrated as an indication in the accompanying drawings in which:

FIG. 3 is a side view of the row of FIG. 2, FIGS. 4, 5, 6 and 7 are side, front and slightly perspective from below and from above, respectively, views of a group according to the present invention for the plant of FIG. 1.

In the accompanying drawings identical parts or components are indicated by the same reference numbers.

DETAILED DESCRIPTION OF THE INVENTION

With reference to the attached figures, a photovoltaic plant 1 has been illustrated, in particular, but not necessarily, on the ground or that can be installed on the ground comprising a plurality of units 2 each having at least one respective photovoltaic panel 3, if desired also a plurality of panels, for example two, three, four, five or more.

If desired, the photovoltaic panels 3 have a plan configuration which is substantially rectangular or square.

Preferably, the photovoltaic panels 3 of a respective unit are parallel to one another and side by side with respective edges adjacent and in contact with those of adjacent panels.

The panels can have any suitable dimensions, for example a length of about 1.5-2.5 meters, if desired about 2 meters, and a width of about 0.8-1.2 meters, for example 1 meter.

The panels 3 can be of a suitable type, for example with peak powers higher than 400 Wp (Watt peak=Peak power of the photovoltaic panel), if desired mono and poly crystalline with 72 power cells, substantially equal to 435 Wp.

Clearly, panels with different dimensions or powers could be provided.

If desired, the panels can also have active double-sided cells, which therefore absorb light from both their faces.

In any case, in the present description, when the detection face of the panels 3 is indicated, reference will be made to the upper, in use, face of the photovoltaic panels or of the respective cells, thus not considering the possible presence of a possible lower detection face.

The plant 1 then includes a support structure 4 of the units 2 designed to be driven (in part) or constrained to the soil or ground GR and support the units 2 at a distance from the soil or ground GR, for example at about 1-2 meters from the soil.

Preferably, one, some or each unit 2 is/are, in use, inclined in such a way that the respective photovoltaic panel(s) 3 or rather the respective active detection face is facing or can be positioned so as to be facing toward south, therefore with its own lower end 3a closer to the south than a respective upper end 3b, which is clearly at a higher level than the lower end 3a.

In this case, of course, if the photovoltaic panels are traditional, and thus with cells with one active face only, then this face is, in use, facing (upwards) and southwards.

Figure 1:
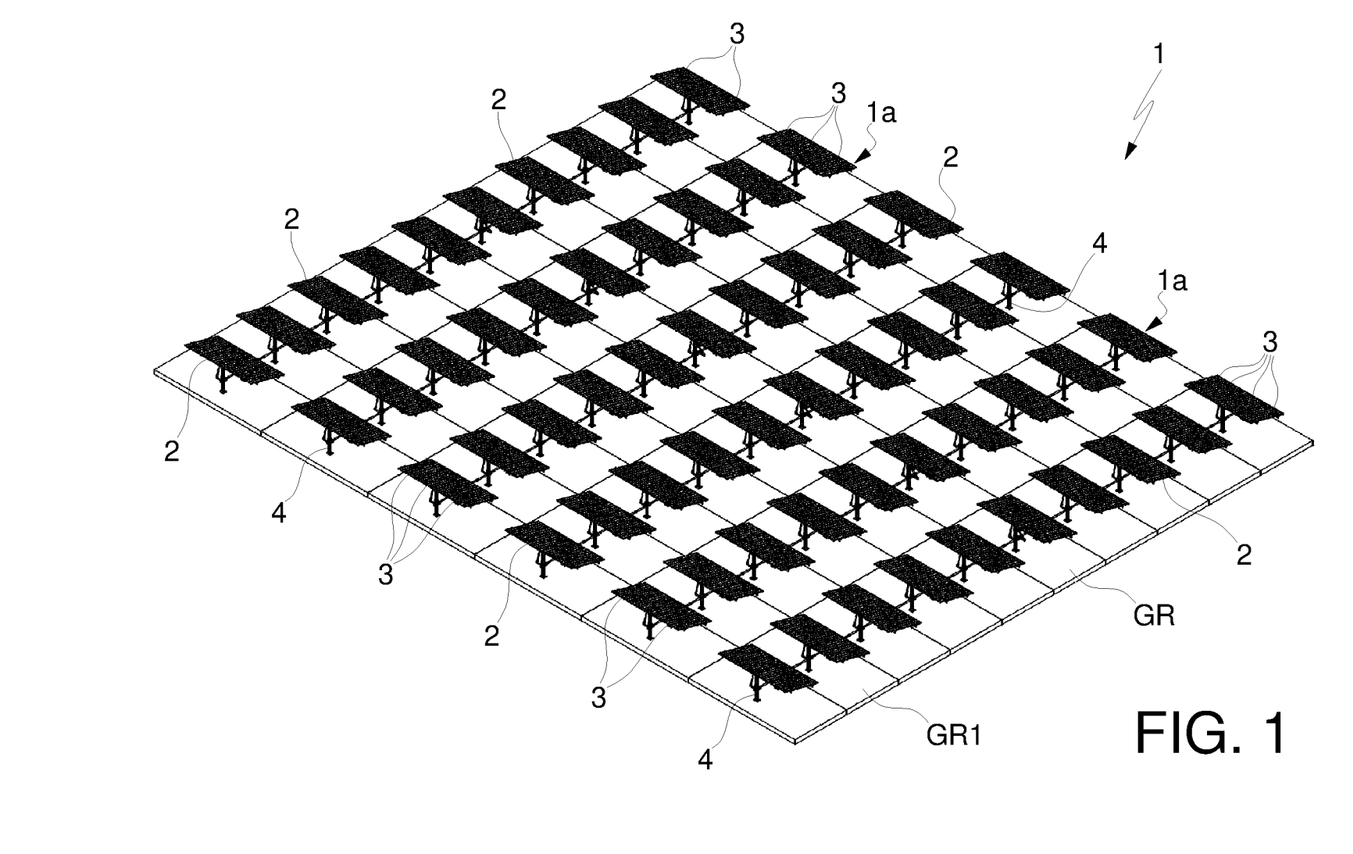
FIG. 1 is a slightly top perspective view of a plant according to the present invention.
Figure 2:
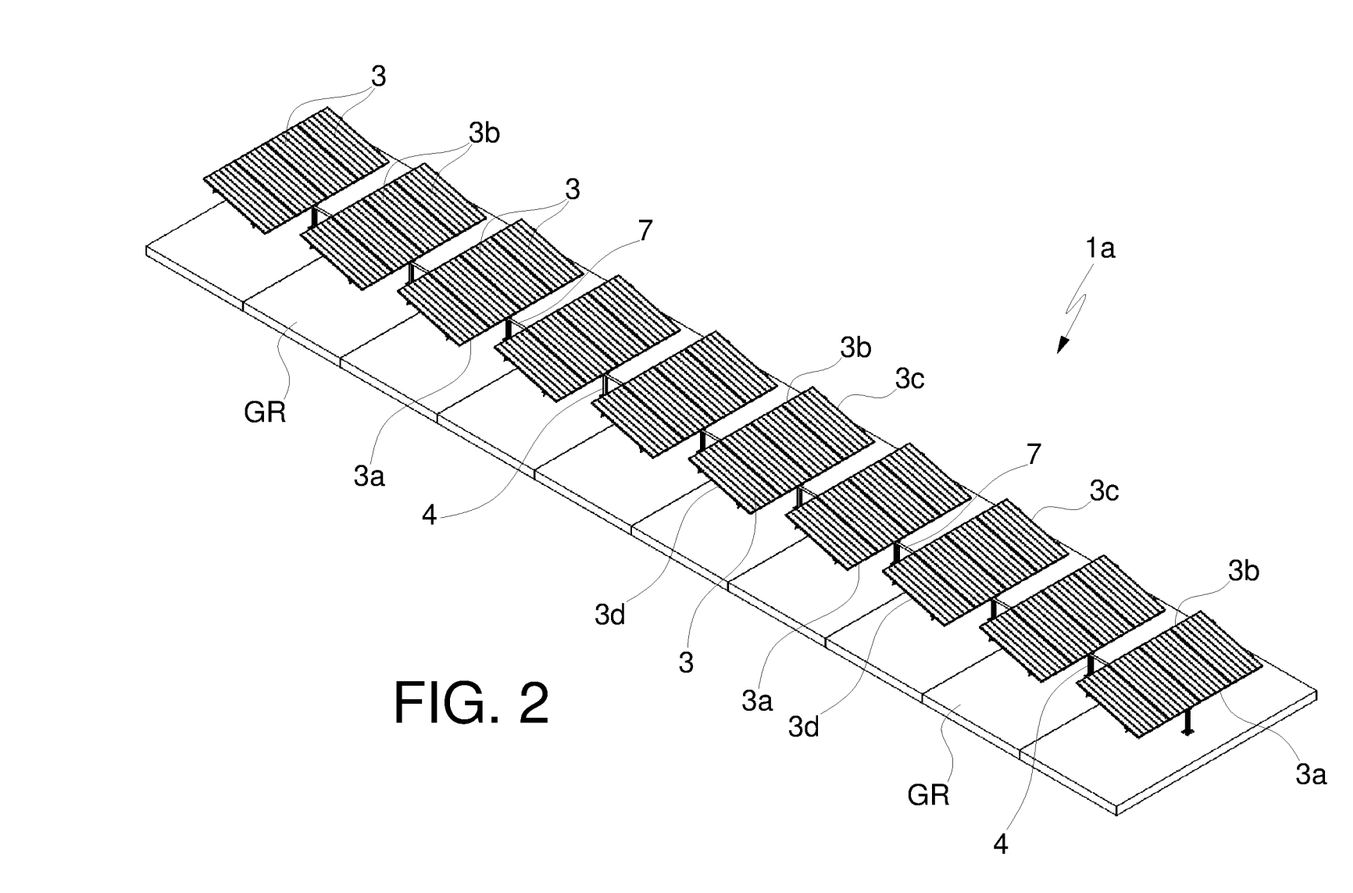
FIG. 2 is a perspective view slightly from above of a row of groups with support units for photovoltaic panels according to the present invention of the plant of FIG. 1.
Figure 3:
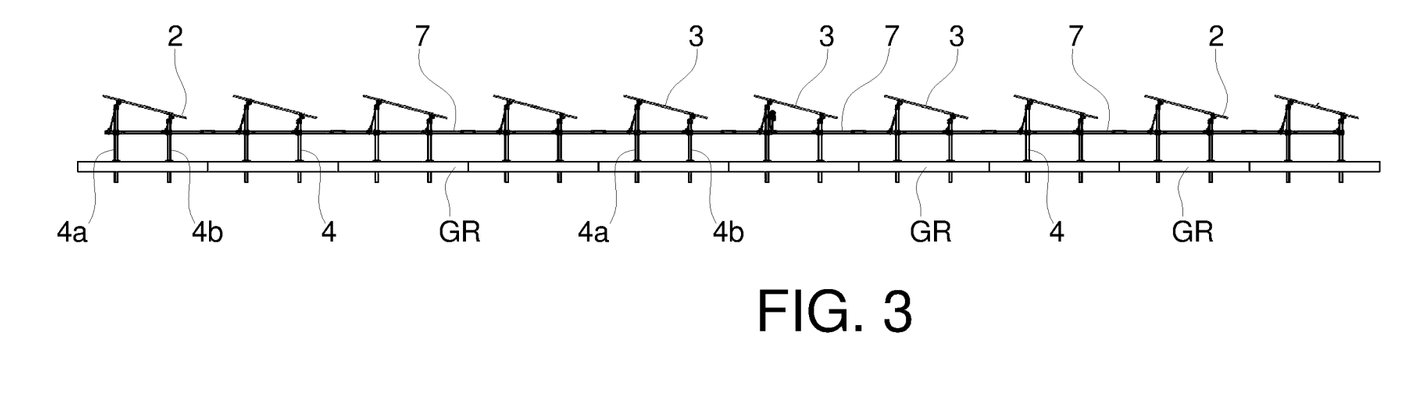
Figure 4:
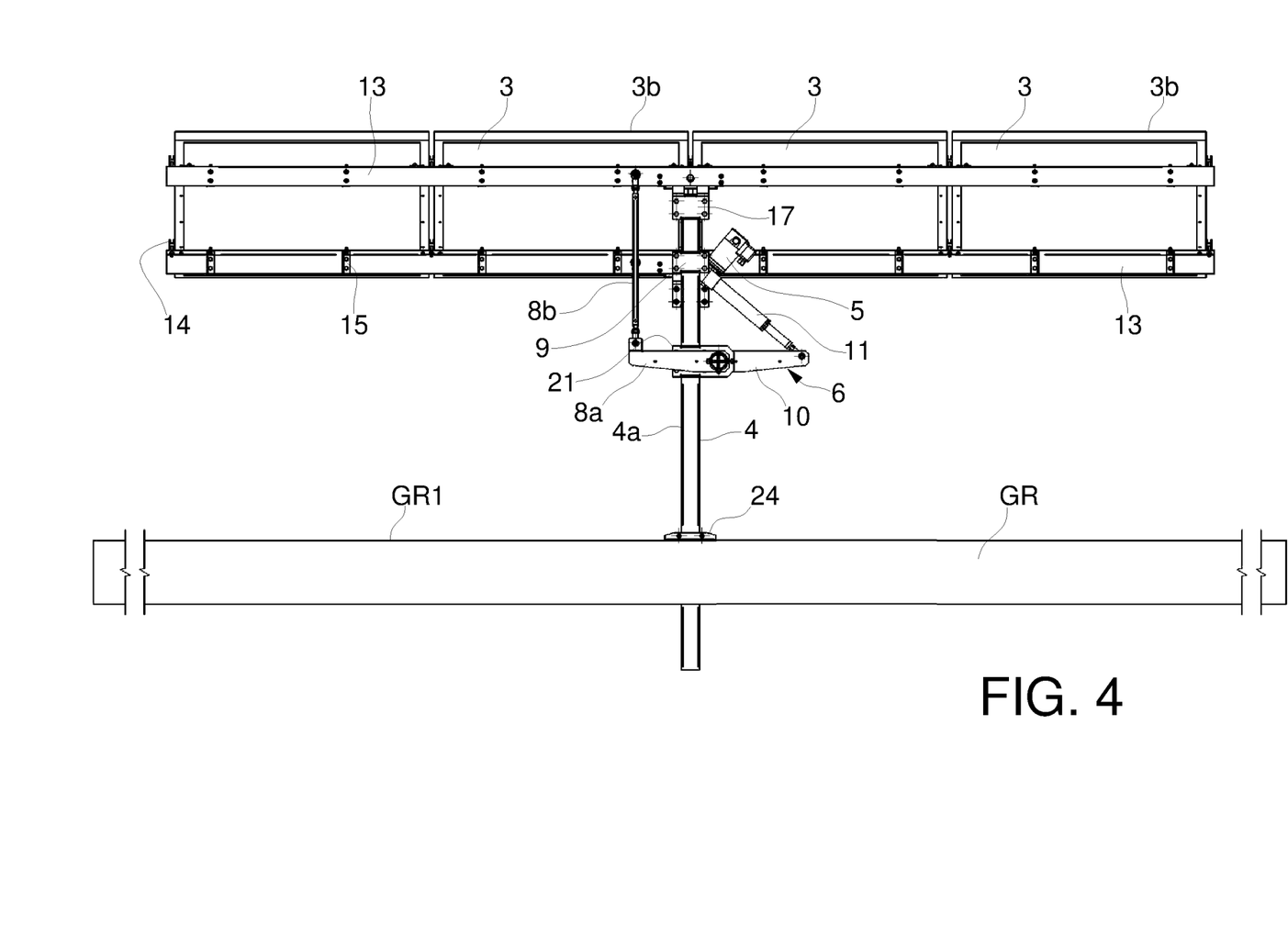
Figure 5:
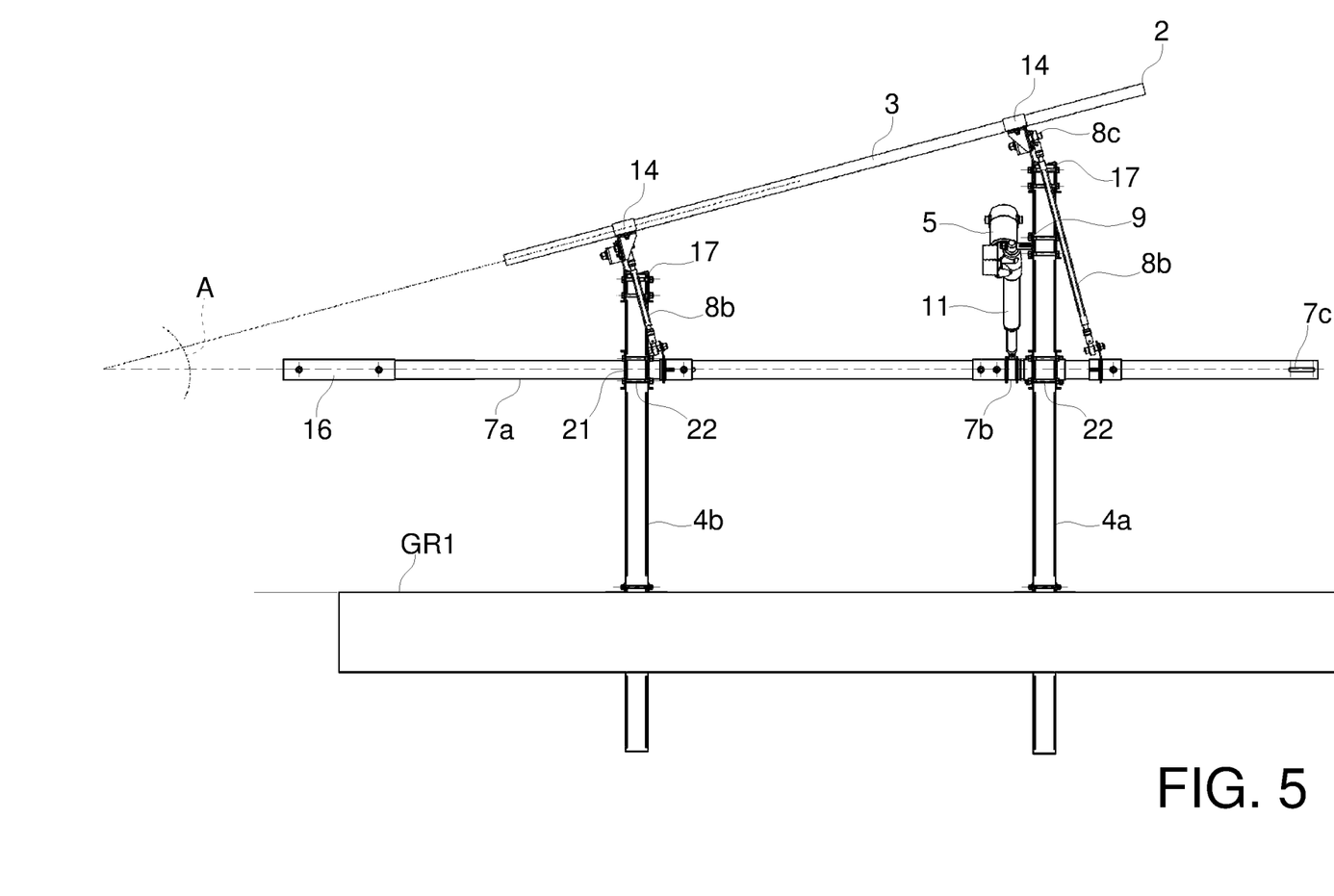

If desired, the units 2 are inclined so that the angle A (see FIG. 5) delimited between the photovoltaic panels 3 (or rather between the main lying plane of the active detection face of the panels 3 or of the respective cells) and a horizontal surface underlying the same is equal to about 10°-20°, if desired about 15°. This naturally applies if the panels 3 are not inclined towards east or west, but, if, as will be said later, such inclination is foreseen, then the angle A is that between the aforementioned horizontal surface and a straight line obtained by joining the lower end 3a, at one side of the unit or better of the respective panel 3, with the upper end 3b, always at this side.

Preferably, the inclination towards south cannot be changed. When this inclination is fixed, the whole plant is rendered compact and with a low visual impact.

In this regard, it was possible to assess that inclinations greater than those indicated above would not give rise to significant increases in electricity production.

Regarding this, if the ground GR on which the plant is mounted has a horizontal upper surface GR1 or substantially horizontal, then this angle is also the angle between the photovoltaic panels 3 (or better between the main lying plane of the active detection face of the panels 3 or of the respective cells) and such upper surface GR1 and is equal to the above indicated value. This applies, as above indicated, in a condition with no inclination towards east or west.

Clearly, all the panels 3 must not necessarily have the same inclination, as they may have different inclination angles.

In this text, the terms "south", "north", "east" and "west" refer to the cardinal points or directions.

The plant 1 is then provided with at least one motor 5, electric, hydraulic or pneumatic, and with motion transmission means 6 from the motor 5 to at least two units 2, so that by activating one motor 5 only it is possible to control the inclination substantially simultaneously in an east-west direction of at least two units 2.

This expedient is clearly designed to ensure tracking of the sun.

The motor 5 can be for example, but not necessarily a direct current motor, if desired a 24 V motor.

The motor 5 together with the motion transmission means 6 can be designed to vary the inclination in an east-west direction, preferably around an axis in a north-south direction, of the units 2, if desired for an angle or arc of angular displacement maximum greater than 80°, for example equal to a value between about 100° and about 130°.

Figure 9:
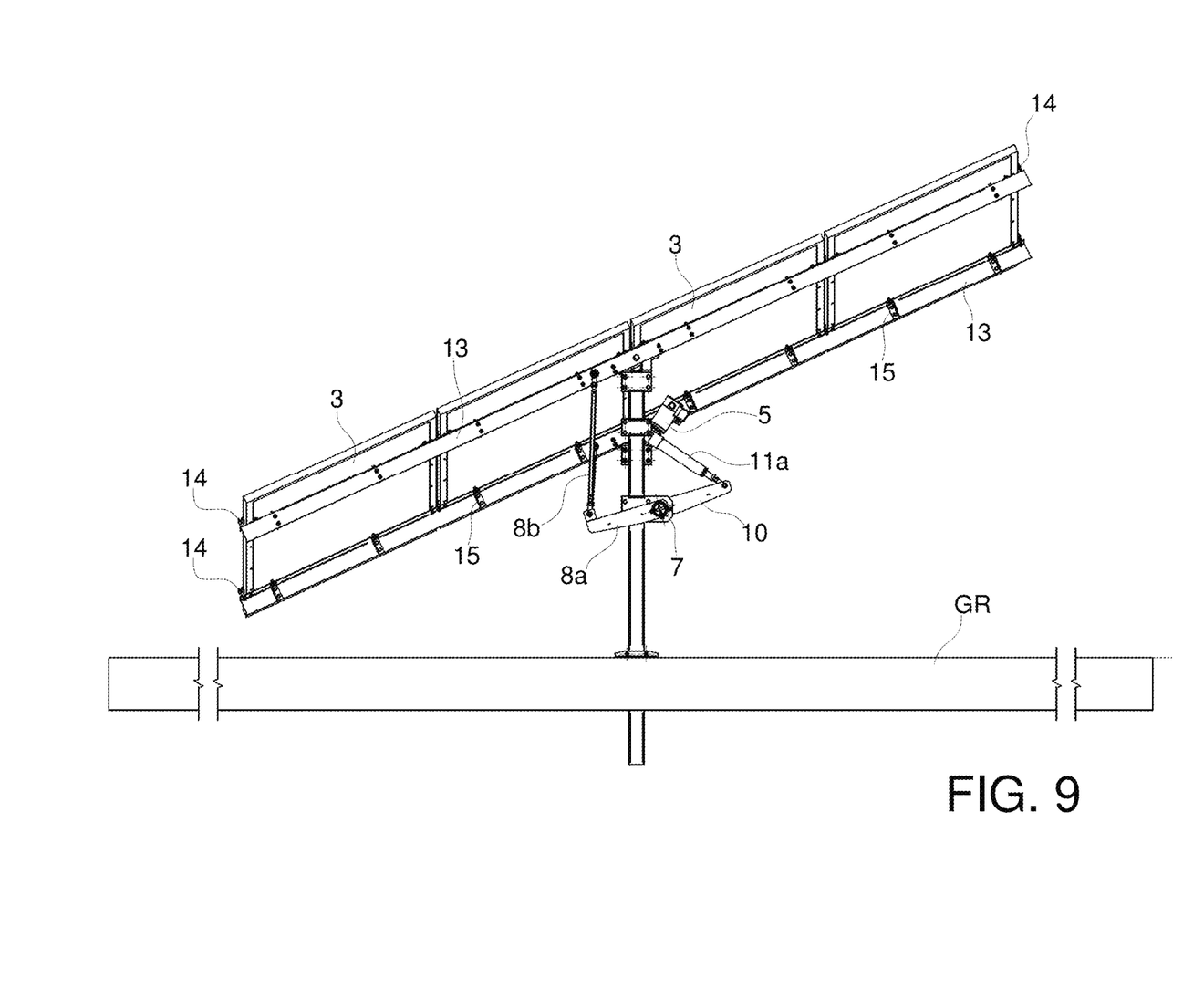
FIG. 9 is a front view of the unit of FIG. 4 in an inclined position in an east-west direction.
Figure 10:
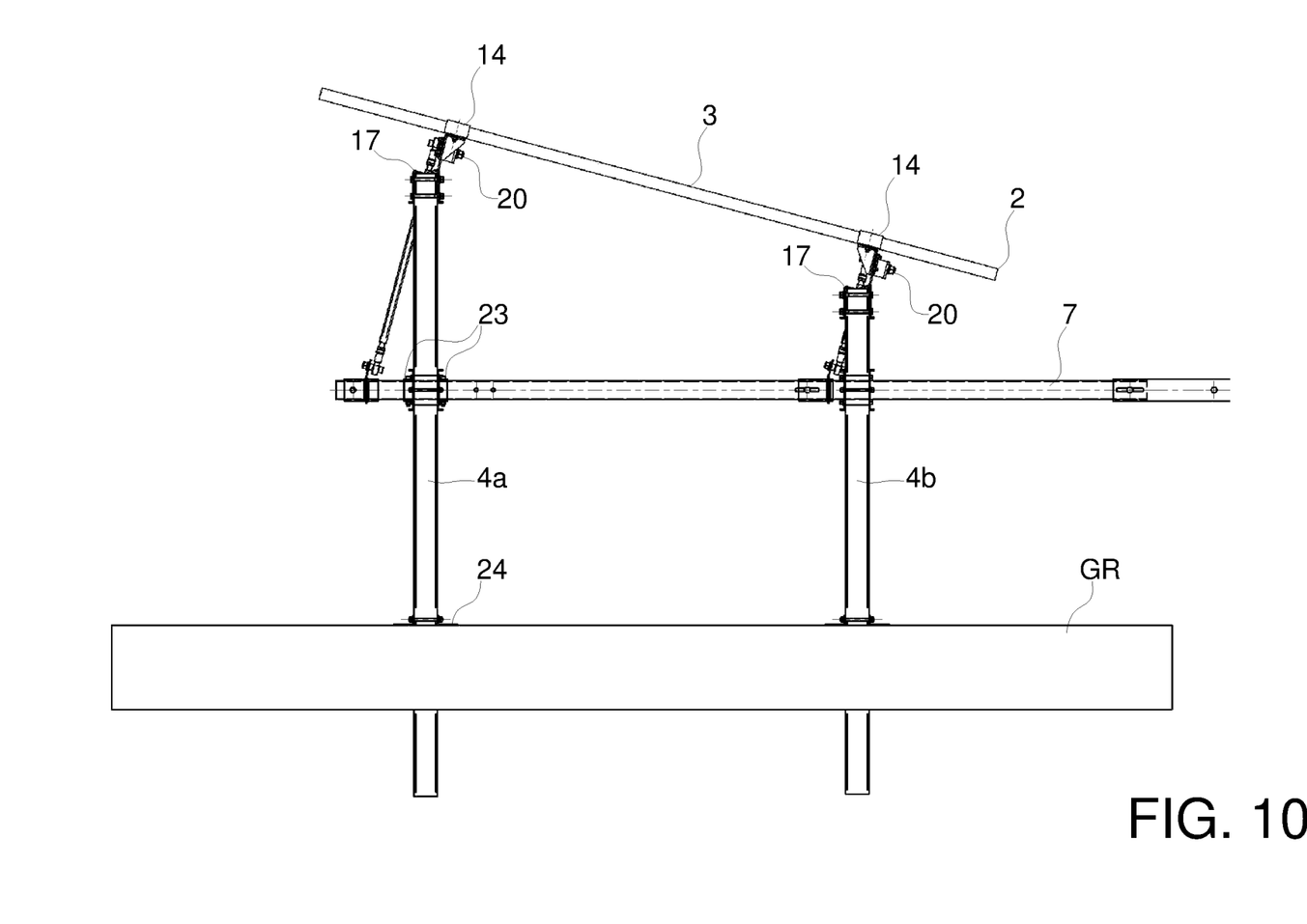
FIGS. 10 and 11 are side views of a unit according to the present invention for a plant of FIG. 1 with respective details concerning the respective rotation shaft of the photovoltaic panels.
Figure 11:
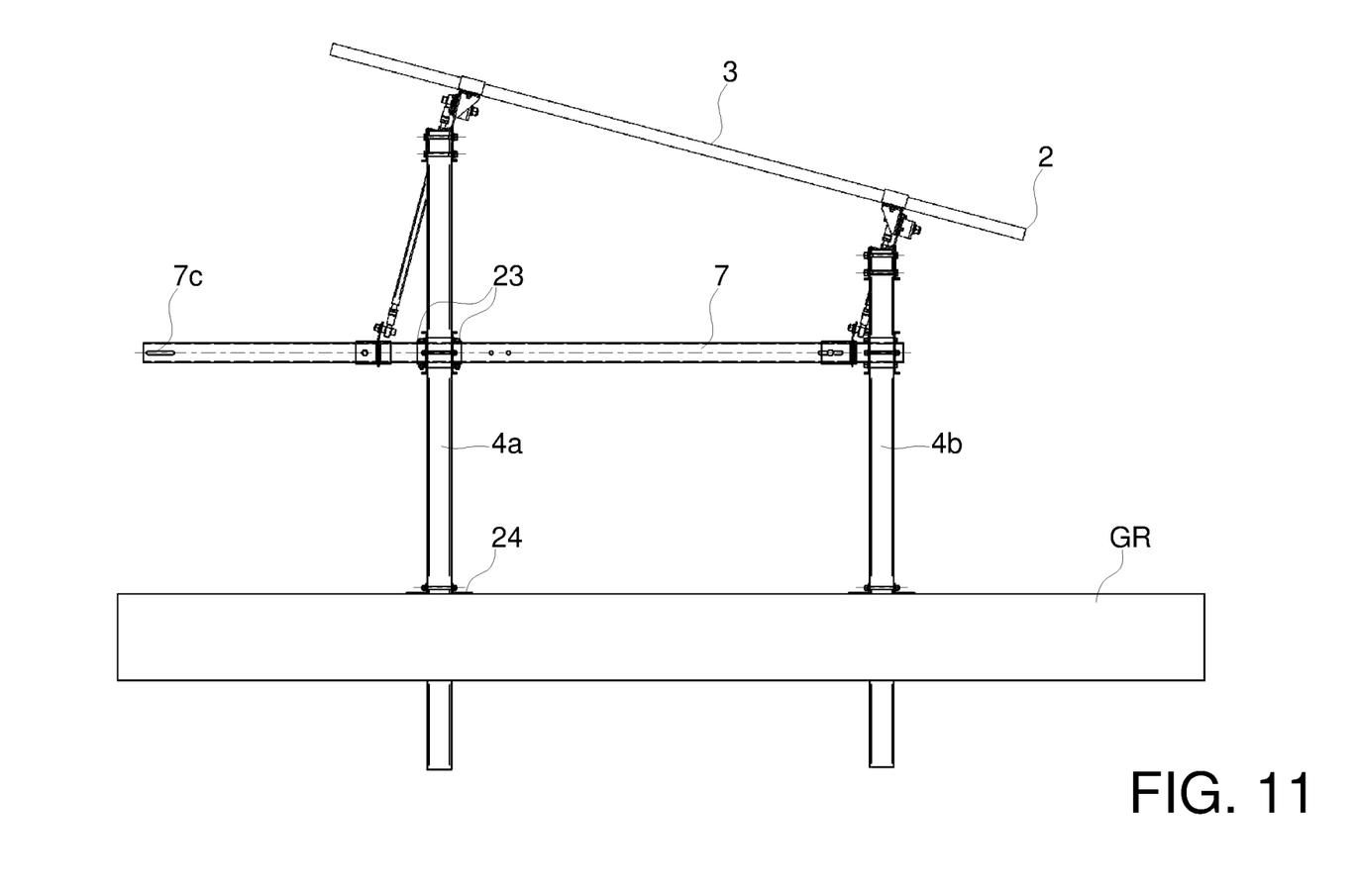

More specifically, the motor 5, thanks also to the transmission means 6, is designed to cause the photovoltaic panels 3 to perform a discretionary tilting movement (see FIG. 9) from a starting position, for example with the panels (or the respective detection face) facing towards east with an inclination of about 20°-30°, if desired 25° with respect to the east, to an arrival position, for example facing towards west with an inclination of about 20°-30°, if desired 25° with respect to the west, passing through a horizontal position at noon.

Naturally, the motor 5 is capable of imparting to the panels a plurality of inclinations in a predefined range, for example greater than 80° or equal to or less than 100° or 130°, not only therefore at the extremes of the inclination range or at the starting and ending position.

If desired, the starting position is imposed on panels 3 in the early hours of the morning, while the arrival position is in the evening. In this case, at noon, the panels 3 could be horizontal, and thus with their sides substantially at the same level.

As it will be understood, in order to tilt the panels 3 in an east-west direction, a first side 3c of the panels 3 must be lowered and/or the other or second side 3d must be raised. In this case, one side at the lower end 3a will be, at the end of the inclination, lower than the other side at the lower end 3c and the same applies to the upper end 3b.

In this regard, the angle of inclination is defined by the straight line passing through the two sides 3c, 3d of the lower end 3a or for the two sides 3c, 3d of the upper end 3b and a horizontal surface underlying the panels 3.

In this regard, if the ground GR on which the plant is mounted has a horizontal or substantially horizontal upper surface GR1, then this angle is also the angle between the lines as now defined and this upper surface.

So far as the horizontal position is concerned, it is a position in which both sides 3c, 3d of the lower end 3a are at the same level and the same applies to the two sides 3c, 3d of the upper end 3b. Therefore, in this position the detection face is preferably not horizontal, but it faces towards south.

If desired, to change again the inclination, one could move the panels backwards and then, if desired, make them incline in the opposite way, by lowering the second side of the panels and/or lifting the first side.

Advantageously, the motion transmission means 6 comprise at least one shaft 7 arranged or aligned in a north-south direction, which shaft can be actuated in rotation by the motor 5 and is integral in rotation with two or more units 2, so that by activating the motor the shaft 7 is made to rotate and thus the inclination or angular displacement towards east or west of these units 2 is controlled and vice versa. If desired, a motion decoupling component from one or more units to the shaft 7 can be provided for, so that the latter can transmit motion to the units, but the reverse does not apply.

Figure 6:
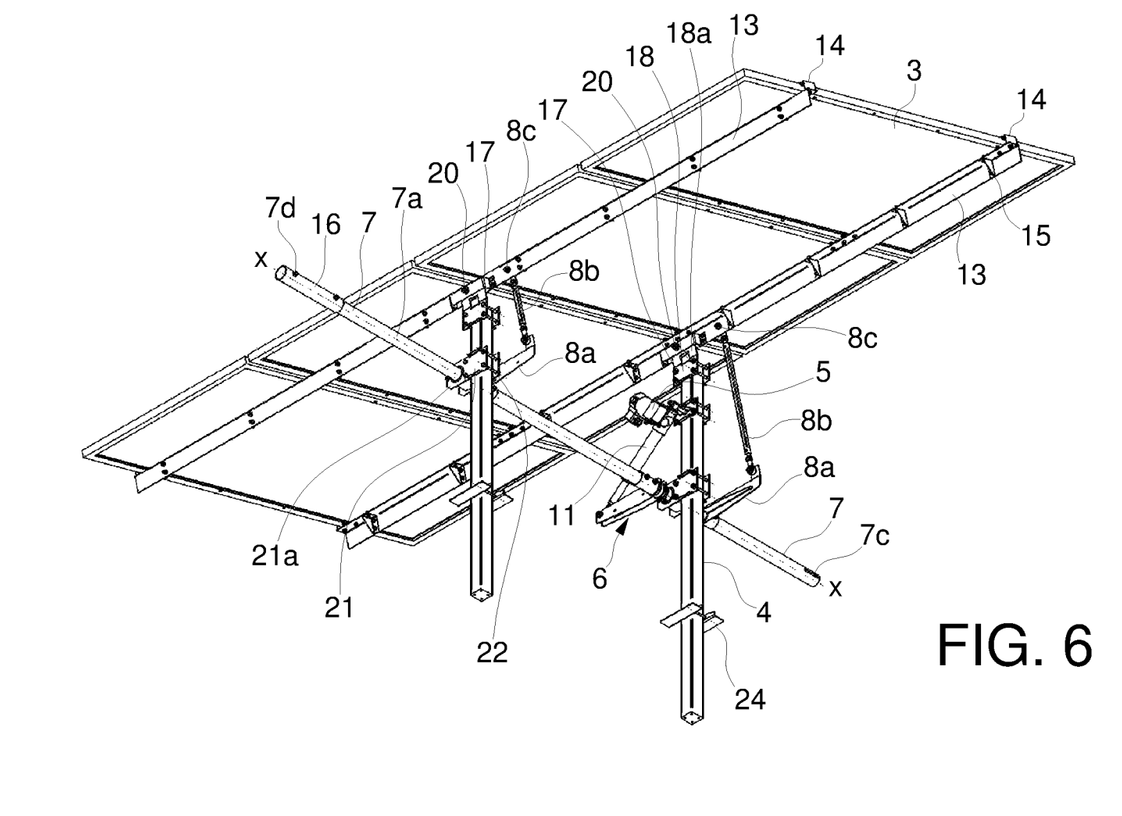
Figure 7:
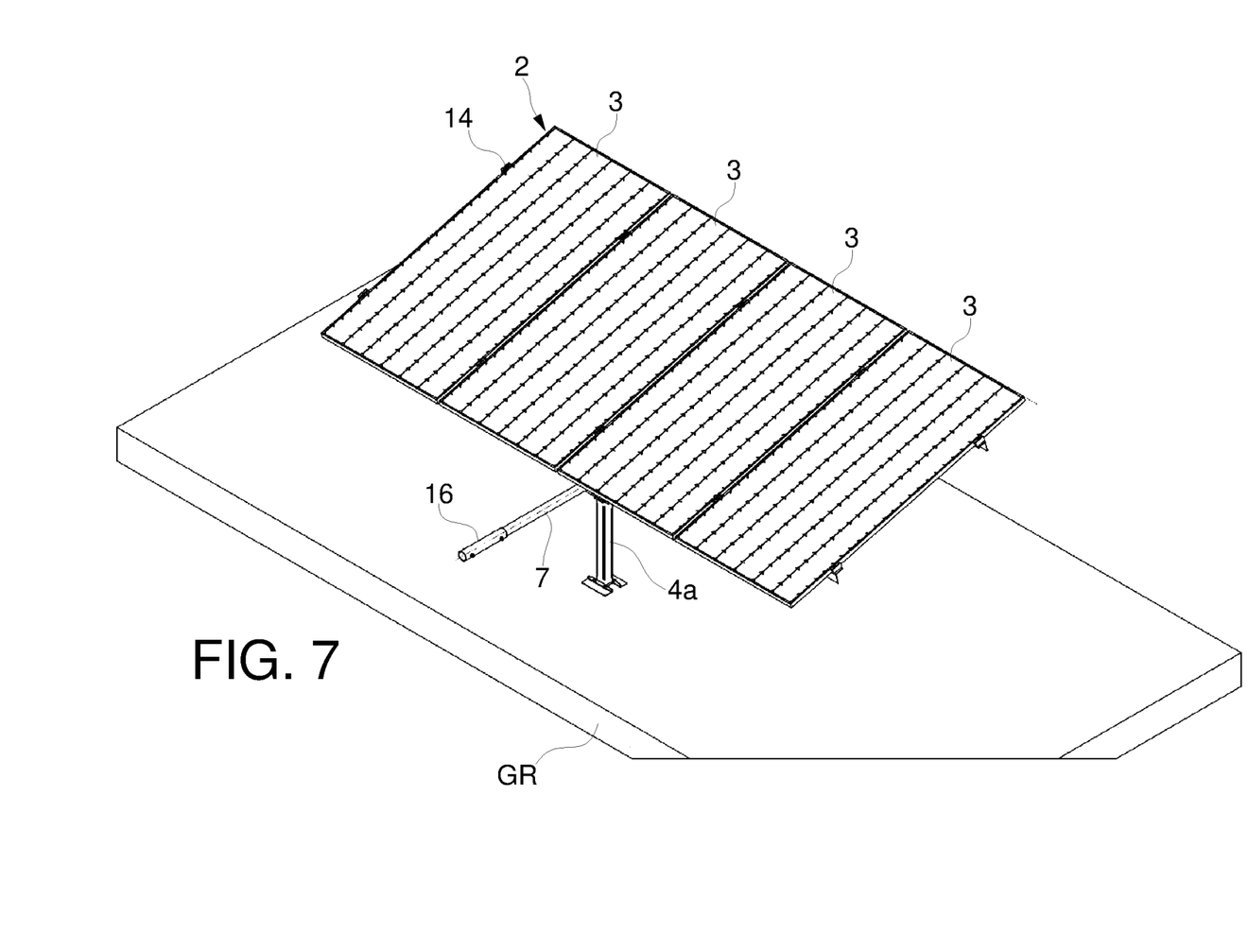
Figure 8:
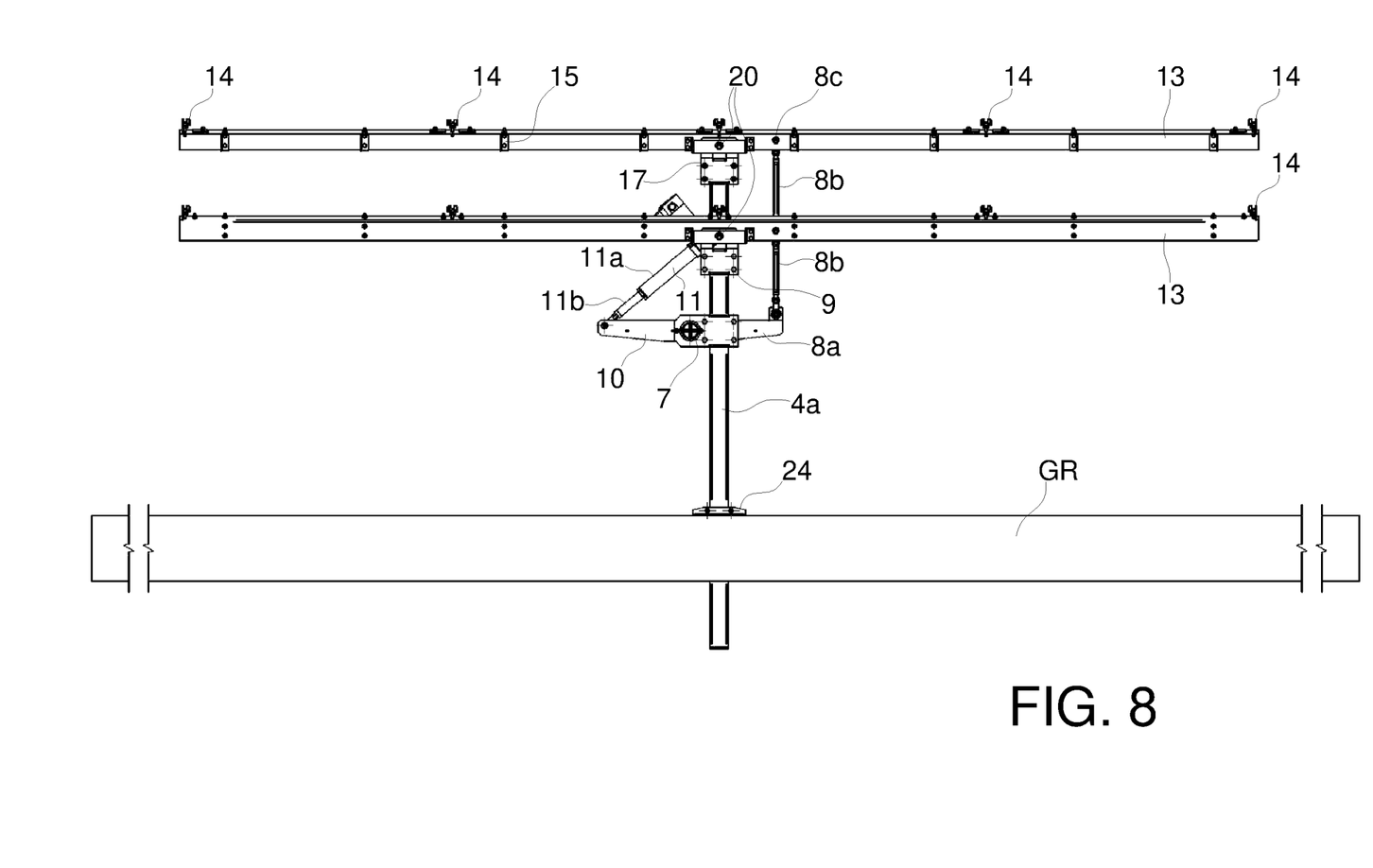
FIG. 8 is a front view of the group of FIG. 4 without photovoltaic panels.

With regard to this aspect, the shaft 7 rotates around a respective main axis of longitudinal extension x-x (see FIG. 6), which is preferably the north-south axis.

Moreover, as it will be understood, the rotation of the shaft in one direction determines the inclination of the panels towards east, while a rotation of the shaft in the other direction determines the inclination of the panels towards west.

Of course, the rotations of the shaft are not complete rotations (360°), but a angle much lower than a complete rotation, if desired between 10° and 20°, 30°, 40° or 50°.

The motion transmission means 6 may also include a plant of brackets and/or rods 8a, 8b arranged to transmit the rotation from the shaft 7 to the units 2 or better to the photovoltaic panels 3.

If desired, this system may comprise for one, some or each unit 2 at least a pair of brackets 8a integral in rotation or angular displacement with the shaft 7 and protruding from positions thereof offset along the respective main extension longitudinal axis x-x and at least one pair of rods 8b each on one side pivoted or articulated to a bracket 8a and on the other to a respective portion of a respective unit 2. If desired, said rods 8b are articulated to a respective unit 2 by means of spherical joints 8c or of another type.

The brackets 8a can have, in use, a substantially horizontal arrangement, while the rods 8b rise upwards starting from the brackets 8a or better from a section or end of the same distal from the shaft 7. Clearly, during the inclination of the units 2 towards east or west, the arrangement of the brackets 8a and rods 8b varies slightly.

The rods 8b can be inclined so as to have an upper, in use, end which is closer to the south of the respective lower, in use, end.

The brackets 8a can for example be integral or in one piece with a sleeve fitted and keyed or otherwise integral in rotation around the axis x-x on a respective section or section 7a of the shaft 7.

Preferably, the two rods 8b of o for a respective unit 2 have different lengths because they are designed to be constrained in offset sections along the axis x-x of a respective unit 2. Therefore, considering that the unit 2 is inclined so as to ensure that the respective photovoltaic panel(s) 3 (or rather the respective detection face) is facing towards south, these rods 8b will have a length greater than the other and more specifically the length proximal to the north and distal to the south will be longer and vice versa.

Such a condition can also occur for the two brackets 8a, which therefore can have different lengths.

The motor 5 can instead be supported by a support component or frame 9 integral with the support structure 4 and a lever or a pair of levers 10 of the motion transmission means 6 from the motor 5 or by an actuator 11 controlled thereby to the shaft 7 can then be provided. The lever or pair of levers 10 is, on the one hand, pivoted to the stem 11b of such actuator 11, if desired to a tip of the same and on the other it is integral with the shaft 7, for example fixed or in a single piece with a bush 7b fitted and keyed onto a section of the shaft 7 or in any case constrained so as to be integral in rotation with the latter around the axis x-x.

The motor 5 can be supported at a height of about 0.8-1.2 meters, if desired 1 meter from the soil GR.

As already partially indicated above, at least one actuator 11 can be provided, if desired linear, with a cylinder 11a and a stem 11b that can be inserted/disinserted into/from the cylinder 11a, in which case the motor 5 is arranged to control the insertion/disinsertion of the stem 11b into/from the cylinder 11a. The stroke of the actuator 11 can be any suitable one, for example 100-200 mm, if desired 160 mm.

The actuator 11 can be arranged with an upper cylinder 11a and stem 11b arranged to come out towards the bottom of the cylinder 11a.

If desired, in the case of an electric motor, a gearmotor is provided from the motor 5 to the actuator 11, so as to determine a specific speed of advancement or disinsertion/insertion of the stem 11b in/from the cylinder 11a, advantageously equal to about 3-6 mm/s, for example 4 mm/s. The actuator 11 or the motor-actuator unit can also be equipped with a position transducer and/or limit switch. This transducer is of course designed to control the position and/or the limit switch of the respective stem 11b. If a position transducer is provided, then the actuator can also be equipped with a digital output for reading the stroke of the stem 11b both in push and pull.

The actuator 11 is preferably suitable for performing intermittent work cycles and very reduced and repetitive displacements over time, this being achieved thanks to a high number of engine revolutions, low installed power, large reduction ratio and very small speed of advancement of the stem, for example as indicated above.

Of course, the extension/retraction of the stem 11b from/into the cylinder 11a is gradual and can be locked in position by the engine 5 in a series of trims or positions between the maximum retraction position and the maximum extension position.

The actuator 11, if provided, can even be supported by the support component or frame 9 or by another component integral with the support structure 4.

According to the non-limiting embodiment illustrated in the figures, the cylinder 11a of the actuator 11 is constrained, for example by means of a screw or bolt or any other suitable means to the support component or frame 9, while the motor 5 is mounted in such cylinder 11a and supported thereby.

With such a structure, by activating the motor 5, this determines the extension or retraction of the stem 11b and thus the angular displacement of the lever or levers 10, thereby determining the rotation in one direction or the other of the shaft 7 and therefore the inclination or angular displacement of two or more units 2 and of the respective photovoltaic panels 3 towards east or west (depending on the direction of rotation of the shaft). With reference to the non-limiting embodiment illustrated in the figures, the rotation of the shaft 7 determines the displacement of the system of brackets and/or rods 8a, 8b designed to transmit the rotation from the shaft 7 to the units or to a respective unit 2.

In this regard, the rotation of the shaft 7 causes an angular displacement of the brackets 8a and therefore of the rods 8b, which transmit the motion to a respective unit 2.

As regards in particular the structure of the units 2, one or more of the same can include at least two beams or longitudinal members 13 offset from each other and supporting at least one photovoltaic panel 3.

If desired, but not necessarily, the longitudinal members 13 are placed with the respective main extension direction, in a transverse or orthogonal direction to the shaft 7, for example in an east-west direction. In this case, the beams or longitudinal members 13 can be offset in the direction, in use, north-south.

The panels 3 are fastened to the longitudinal members 13 by any suitable method, for example screws, bolts, adhesive or other.

In this case, this unit 2 could also not comprise bridge connecting transverse elements of the longitudinal members 13. The panels 3 would therefore constitute the connection structure between the two beams or longitudinal members 13. The longitudinal members 13 would in this case be mechanically connected only by means of one or more panels 3.

With reference to this variant, one or more units 2 can comprise terminal retaining means 14 for the panels 3 constrained at the ends of the longitudinal members 13. The terminal retaining means 14 can include suitably shaped or folded and constrained plates, if desired by means of screws, bolts or other means, to the ends of the longitudinal members 13 and arranged to wrap a respective section of the edge of the panels 3.

The terminal retaining means 14 can also be designed to pack and keep the panels 3 on the longitudinal members.

Preferably, for each unit end retaining means 14 are provided which act at least on two opposite sides or ends of the panels so as to clamp them.

Even more preferably, if at least one unit comprises several panels 3, if these are placed side by side, the retaining means 14 act on the edges, in use, external of the panels parallel or substantially parallel to the edges of abutment of the panels side by side so as to act, as indicated above, as packing means for adjacent panels, whereby such means press from the outside a panel in the direction of the other panels of the respective unit 2.

Moreover, the longitudinal members 13 can have a T-shaped configuration, in which case the unit 2 includes reinforcement brackets 15 of the longitudinal members 13 placed in one or both of the seats delimited between inclined or orthogonal sections of the T.

In the event that more panels 3 are provided in at least one unit, then support and hooking means 14a between panels can be included for this unit. Said support and hooking means 14a can be mounted on and supported by one or both longitudinal members 13, at the zone of abutment of edges of adjacent panels.

The longitudinal members 13 can be obtained, for example, from a folded sheet or in another suitable way.

Therefore, preferably the metal transverse elements normally used in the support structures for photovoltaics are not provided in the units 2, and thus at least two longitudinal members or beams only are used without apparent junctions between them except the panels themselves; if desired the plant is equipped with suitable safety constrain applied on the units.

This solution aims to obtain the lowest possible material consumption.

If the longitudinal members 13 and the rods 8*b* are provided, then the latter can be articulated, if desired but not necessarily by means of spherical joints 8*c*, to the longitudinal members 13. More particularly, according to the embodiment illustrated in the figures, the pairs of rods 8*b* of or for a respective unit 2 are each articulated to a respective longitudinal member 13. In this regard, the line connecting the pivot points of the rods 8*b* of a unit can delimit the aforementioned angle A with a straight line, preferably horizontal, subtending this connecting line.

A unit 2 as described here is the subject-matter of the present invention even independently by the plant and the other elements herein described.

Advantageously, the plurality of units 2 of the plant 1 comprises one or more rows 1*a* with from five to fifteen units, if desired ten units, each supporting at least one photovoltaic panel 3 or better a plurality of panels, for example two, three, four, five or more side by side and, preferably, packed panels.

In this case, the motion transmission means 6 are designed to transmit the motion from the same engine 5 to all such units 2 of the plant or of a respective row 1*a* (if more rows of units are provided, as will be better described later), so that by operating the motor 5 it is possible to control substantially simultaneously the inclination in the east-west direction of the (from five to fifteen) units 2 of the same row 1*a*.

With reference to the embodiment shown in the figures, the motor 5 is mounted at a unit 2 placed in an intermediate position between the other units 2 of the plurality or better (it is mounted) on the support structure 4 of this unit 2.

If desired, the plant 1 comprises at least two rows or series 1*a* of units 2, each row 1*a* including a plurality of units 2, in which case the plant further comprises at least two motors 5 each designed to control substantially simultaneously the inclination in the direction east-west of all the units 2 of a respective row 1*a*. The rows 1*a* are clearly offset from each other, in particular in an east-west direction, if desired so that the panels 3 of adjacent and subsequent rows are at a distance greater than one meter, if desired between 2 and 3 meters, for example about 2.5 meters.

In this case, at least two shafts 7 parallel to each other are preferably provided, advantageously arranged or aligned in a north-south direction, each shaft 7 being integral in rotation or better in angular displacement with all the units 2 of a respective row 1*a*, so that by rotating the shaft 7 the inclination or angular displacement towards east or west of these units 2 is controlled and vice versa.

Advantageously, the shafts 7 of adjacent rows are not kinematically connected, and thus the motion of one shaft 7 is not imparted to the other and vice versa.

According to the embodiment illustrated in the figures, six rows 1*a* each with ten units 2 are provided, which include a plurality of (for example three, four, five) panels 3 and six motors 5 are provided each for the inclination or angular displacement drive, if desired by means of respective six shafts 7, of the units 2 of a respective row 1.

Basically, preferably, a respective motor 5 and a respective shaft 7 are provided for each row 1*a*.

If desired, the pitch between the individual units is about 2000-4000 mm, for example 3000-3500 mm, if desired 3150 mm in the north-south direction and about 6000-7000 mm, for example 6500 mm in the east-west direction.

"Natural" passageways between the rows can therefore be delimited, which will ensure easy access both during the construction of the plant and during maintenance.

A plant 1 as described above (non-limiting embodiment of the invention) can ensure for example 1 MWp.

In the future, with the increase in the efficiency of the panels 3 it will also be possible to obtain a decrease in the number of units 2 necessary for the construction of a single plant, for example of 1 MWp, and this reducing the use of agricultural land currently required (for example about 12,000 square meters) with a significant reduction in costs for the individual plant.

So far as in particular the shaft 7 is concerned, it may include several sections 7*a* connected to each other and removably or not connected, if desired by means of suitable joints 16.

The sections 7*a* are naturally aligned along the axis x-x, considering that the shaft 7, and therefore all the sections 7*a* making it, rotates around the main longitudinal axis of extension x-x.

With regard to this aspect, each section 7*a* could be hollow, at least at at least one of its ends, and have holes or a slot 7*c* at one or both of its hollow ends, while the joints 16 have one or a pair of holes or slots, so that it is possible to align one of these holes or slots with a hole or slot 7*c* of a first section 7*a* and the other hole with a hole or slot 7*c* of a second section 7*a* adjacent and subsequent to the first.

In order to constrain the sections 7*a* to each other, it would then suffice to insert screws or bolts 7*d* in these aligned holes/slots and tighten each joint 16 to two respective sections 7*a* by means of these screws or bolts 7*d*.

Instead of a joint 16 one could also use sections 7*a* with a hollow and suitably perforated end and the slot 7*c* at the other end.

Of course, in order to allow small displacements between the sections 7*a*, only one of the two respective sections 7*a* could be fixed at each joint 16, while the other could have a respective end mounted sliding inside or around the joint 16, so that one would in fact have a sliding joint. The same is true if there are no joints.

If desired, in this case, the sections 7*a* would be movable or mounted sliding one with respect to the other, for example by an entity equal to about 0.5-5 cm in the direction of the main extension axis x-x of the shaft 7.

Relatively instead to the support structure 4, it can include, for example poles 4*a*, 4*b*, if desired in prestressed concrete, which are fixed in the ground, with vertical arrangement, according to the non-limiting embodiment shown in the figures.

Two poles 4*a*, 4*b* can be for example provided for each unit 2, at the top of each of which a respective longitudinal member 13 is hinged either directly or by interposition of a suitable constraining component or group of components 17.

In the case of two poles 4*a*, 4*b* for one unit 2, they can comprise a first higher pole 4*a* designed to support a respective unit 2 at an upper end 3*b* of the panels 3 and a second lower pole 4*b* designed to supporting a respective unit 2 at a lower end 3*a* of the panels 3 of unit 2. The first pole 4*a* is driven into the ground GR in an area closer to the north than the second pole 4*b*.

This expedient ensures the inclination of units 2 towards south.

The poles 4*a*, 4*b* can have any suitable length, such as between 1 and 2 meters, if desired a first pole of about 1400-1600 mm, for example 1500 mm and a second pole of about 1800-2000 mm, for example 1850 mm, both with a section driven into the ground for 300-800 mm, if desired about 500 mm.

The two poles 4a, 4b are suitably spaced apart, for example by about 1-1.5 meters, if desired, about 1.2 meters.

The poles can be driven into the ground using a pile-driving machine, for example with controlled vibration and, if desired, equipped with GPS positioning (starting from a known topographical point), which can guarantee a maximum error of 1 cm in the insertion and an error on the vertical of the pole of maximum 0.2°, which errors are clearly acceptable without compromising the functionality of the rotation mechanism.

The section of these poles 4a, 4b can be small, for example 70×70 mm and they are capable of effectively replacing the expensive foundation works normally required in similar applications.

With reference to the non-limiting embodiment shown in the figures, the group of constraining components 17 comprises two first plates 18 mounted one opposite the other with respect to an upper end of a respective pole 4a and linked together by means of first screw or stud elements 19. One of the plates 18 has also an appendix 18a to which a respective longitudinal member 13 is hinged by means of a respective pin 20, if desired at the center line or intermediate zone of the longitudinal member 13.

Two second plates 21 are provided for connecting the shaft 7 to the poles 2a, again according to the non-limiting embodiment illustrated in the figures, which plates 21 are mounted one opposite to the other with respect to an intermediate section of a respective pole 4a and fixed one to the other by means of second screw or stud elements 22.

One or both the second plates 21 can also have a projecting section 21a delimiting a hole for the passage of the shaft 7 or rather of a section or segment 7a of the same.

If desired, the supporting component or frame 9 can have a structure similar to that described for the group of constraining components 17.

In order to prevent the shaft 7 from sliding with respect to the poles 2a, the plant 1 can be provided with locking rings 23 arranged at the holes delimited by the second plates 21. This expedient can be provided at one or both poles 4a, 4b.

Moreover, the poles 2a can be provided with anti-break-in brackets 24 at the bottom of the same, designed to be, in use, close to or in contact with the driving soil or ground GR.

A plant according to the present invention must then be clearly equipped with one or more inverters to convert the direct electricity produced into alternating current.

The plant could then include a control unit designed to control the respective components, in particular the motor 5 to appropriately vary, in particular during the day, the east-west inclination of the units 2 and thus of the respective panels 3.

Moreover, the plant can then provide markings in the ground for the positioning of the ducts for housing the electrical power cables that will connect the inverters to the medium voltage substation.

It should also be noted that the subject-matter of the present patent application also independently of the aforementioned plant is a group for a ground photovoltaic plant comprising a unit 2 as described above, a support structure 4 as described above arranged, in use, to support the unit 2 at a distance from the ground GR, a motor 5 supported by a support component or frame 9 integral with the support structure 4, motion transmission means 6 from the motor 5 to the unit 2 comprising a shaft 7 or a section 7a of a shaft 7, so that by operating the motor 5 it is possible to control the inclination of the unit 2.

This assembly can comprise components described above, for example an actuator 11, while the motor 5 can be an electric motor with a gearmotor from the motor 5 to the actuator 11, so that the speed of advancement or disinsertion/insertion of the stem 11b in the cylinder 11a is about 3-6 mm/s, for example 4 mm/s.

A system of brackets and/or rods 8a, 8b as indicated above can then be provided in this group.

As it will be possible to ascertain, a plant according to the present invention has thus a single drive motor and, preferably, a single drive shaft which connects and drives several units, even ten or more, each provided with two, three, four or more photovoltaic panels, for example with high efficiency.

The single motorization of several units, makes it possible to significantly reduce the costs for tracking the sun, if one considers, for example, that in order to drive a 1000 KWp system, the use of even a few actuators is sufficient, for example 57.

Therefore, owing to the present invention, a monoaxial solar tracker is actually obtained.

The southward inclination of the panels makes the plant efficient and, in particular when the inclination is fixed, ensures limited overall dimensions and low visual impact.

Another important, although not essential, aspect of the present invention is the preparation and possible use of new photovoltaic units or panels that act as a connecting structure between two main beams or longitudinal members, preferably without metal transverse elements normally used in photovoltaic support structures. It is therefore possible to use only two bent sheet beams without junctions between them other than the one obtained owing to the panels themselves.

This expedient allows, together with the other aspects discussed, to reduce the necessary material.

Another functional solution for reducing costs is the possible use of prestressed concrete poles, which are particularly suitable when they are subjected to bending resulting from the thrust of the wind.

In this regard, if, for example, the panels were at a maximum height of about 1600 mm at the highest point and a minimum height of about 1060 mm at the lowest point, by rotating them towards east and west the highest point would be positioned at about 2422 mm, but the opposite corner of the units on the same side would drop to 1853 mm from the ground. It will be understood that in this case, the wind stress on the concrete poles and more generally on the metal structures of the plant is lower. Furthermore, concrete poles have a very low cost as well as their positioning during the installation phase of the plant.

From an environmental point of view, if we exclude the tracing of the ground for the positioning of the ducts for housing the electrical power cables that will connect the inverters to the medium voltage substation, there is no need to carry out other works that could compromise or modify the conformation and quality of the bottom where the photovoltaic plant will be installed.

Owing to the present invention it is therefore possible to reduce the overall cost of a photovoltaic plant, so as to make the energy produced by the photovoltaic plant competitive even with that produced by fossil sources, creating the so-called "market parity".

Of course, the present invention can be used for the construction of plants of any power, both 1 MWp but also higher, for example of 2, 3, 5, 10 or more MWp. The substantial difference between the different power sizes lies in the authorizations necessary for the construction of the work, or in the PAS (procedure similar to SCIA) for plants up to 1 MWp (999 KWp) simple to obtain (on average 30/60 days) and the longer and more complex Single Authorization for plants over 1 MWp to obtain (it is also necessary to wait years before receiving approval from the relevant region).

In any case, depending on the maximum power of the plant to be built, it is sufficient to replicate and appropriately combine a certain number of standard units as described above.

Changes and variants of the invention are possible within the scope defined by the claims.

What is claimed is:

1. A photovoltaic plant comprising a plurality of units each having at least one respective photovoltaic panel, a support structure of said plurality of units designed to support the plurality of units at a distance from the ground, further comprising at least one motor and motion transmission means from said at least one motor to at least two units, so that by activating only one motor it is possible to control substantially simultaneously the inclination in an east or west direction of said at least two units;
   wherein said motion transmission means comprise at least one shaft arranged or aligned in a north-south direction, said at least one shaft being actuatable in rotation by said at least one motor and being integral to directly cause angular displacement of said at least two units, wherein by activating said at least one motor the rotation of said at least one shaft is determined and thus the angular displacement towards east or west of said at least two units is controlled,
   wherein said at least one shaft includes several sections connected to each other,
   wherein said at least one shaft rotates around a respective main axis of longitudinal extension,
   wherein at least one unit of said plurality of units is inclined so that said at least one respective photovoltaic panel is facing south, therefore with its own lower end closer to the south than a respective upper end,
   wherein said photovoltaic plant further comprises at least one actuator having a cylinder and a stem which can be inserted in said cylinder and/or disinserted from said cylinder and wherein said at least one motor is provided to control the insertion of said stem in said cylinder and/or the disinsertion of said stem from said cylinder, and
   wherein such insertion and/or disinsertion of the stem determines an angular displacement of at least one lever, said at least one lever having one end pivoted to the stem of said at least one actuator, and another end integral with the at least one shaft, the angular displacement of the at least one lever determining the rotation in one direction or the other of the at least one shaft and therefore the inclination or angular displacement of said at least two units and of their respective photovoltaic panels towards east or west.

2. The photovoltaic plant according to claim 1, wherein said at least one motor is an electric motor and a gearmotor is then provided for the motion from said motor to said actuator, so that the stem is inserted and/or disinserted in said cylinder at a speed of about 3-6 mm/s.

3. The photovoltaic plant according to claim 1, wherein said motion transmission means for at least one unit comprise at least one pair of brackets protruding from said at least one shaft and extending from positions of the at least one shaft and offset along the respective main axis of longitudinal extension and at least one pair of rods each rod having one end pivoted or articulated to a bracket and a second end affixed to said at least one unit.

4. The photovoltaic plant according to claim 3, wherein said at least one pair of rods are articulated to said at least one unit by means of spherical joints.

5. The photovoltaic plant according to claim 1, wherein at least one unit comprises a pair of beams or longitudinal members offset with respect to the other and supporting said at least one photovoltaic panel.

6. The photovoltaic plant according to claim 5, wherein at least one unit comprises terminal retaining means for said at least one respective photovoltaic panel constrained at the ends of said longitudinal members.

7. The photovoltaic plant according to claim 1, comprising joints for connecting said several sections of said shaft, each of the several sections having at least hollow ends, and having at least one hole or slot at one or both of the hollow ends, while the joints have at least one hole or slot so that it is possible to align said at least one hole or slot of at least one of the joints with a hole or slot of a first section of the several sections of said shaft and the other hole with a hole or slot of a second section of the several sections of said shaft that is adjacent to the first section, wherein the first and second sections are constrained by screws or bolts inserted in said at least one hole or slot of the first and second sections, and tightening at least one of the joints to at least one of the first and second sections by means of said screws or bolts.

8. The photovoltaic plant according to claim 1, wherein said at least one motor is designed to vary the inclination in the east-west direction of said units by an angle or arc of maximum angular displacement greater than 80°.

9. The photovoltaic plant according to claim 1, wherein said support structure comprises poles made of prestressed concrete.

10. A group for a ground photovoltaic plant comprising a unit having at least one respective photovoltaic panel, a support structure of said unit designed, in use, to support the unit at a distance from ground, at least one motor supported by a support component or frame integral with said support structure so that said at least one motor is supported at the distance from the ground, motion transmission means from said at least one motor to said unit, so that by activating said at least one motor it is possible to control the angular displacement or inclination of said unit, said motion transmission means comprising a shaft, said shaft being operable in rotation by said at least one motor and being integral in angular displacement or inclination of said unit, so that by activating said at least one motor the rotation of said shaft is determined and thus the angular displacement or inclination is controlled towards the east or west of said unit,
   wherein said shaft comprises several sections connected to each other,
   wherein said shaft rotates around a respective main axis of longitudinal extension,
   wherein said unit is inclined so that said at least one respective photovoltaic panel is facing south, so that a lower end of said at least one panel is closer to the south than an upper end of said at least one panel,
   wherein said photovoltaic plant further comprises at least one actuator having a cylinder, and a stem which can be inserted in said cylinder and/or disinserted from said cylinder and wherein said at least one motor is provided to control the insertion of said stem in said cylinder and/or the disinsertion of said stem from said cylinder, and wherein such insertion/disinsertion of the stem determines an angular displacement of at least one lever, said at least one lever having one end pivoted to the stem of said at least one actuator, and another end integral with at least one section of the shaft, the angular displacement of the at least one lever determining the rotation in one direction or the other of the at least one section of the shaft and therefore the inclination or angular displacement of said unit and of the at least one respective photovoltaic panel towards east or west.

* * * * *